June 24, 1947.  F. F. JOHNSON  2,422,906
STAR-DELTA MOTOR CONTROLLER
Filed June 22, 1944  2 Sheets-Sheet 1

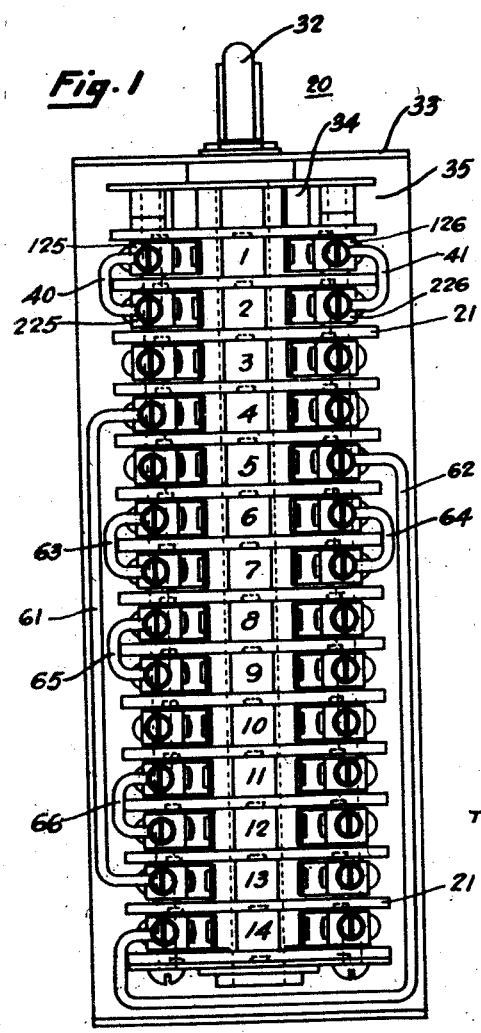

| MOTOR CONNECTIONS DIAGRAM | | | | | |
|---|---|---|---|---|---|
| SPEED | L1 | L2 | L3 | OPEN | JOIN |
| 1 LOW | T1 | T2 | T3 T7 | T4-5-6-11-12-13 14-15-16-17 | |
| 2 SECOND | T11 | T12 | T13 T17 | T1-2-3-4-5-6-7- 14-15-16 | |
| 3 THIRD | T6 | T4 | T5 | T11-12-13-14-15- 16-17 | T1-2 3-7 |
| 4 HIGH | T16 | T14 | T15 | T1-2-3-4-5-6-7 | T11-12 13-17 |

4 POLE PARALLEL Y
T16-T14-T15 TO LINE.
T11-T12-T13-T17 TOGETHER.

8 POLE SERIES △
T11-T12-T13-T17 TO LINE
T14-T15-T16 OPEN.

6 POLE PARALLEL Y
T6-T4-T5 TO LINE.
T1-T2-T3-T7 TOGETHER.

12 POLE SERIES △
T1-T2-T3-T17 TO LINE
T4-T5-T6 OPEN.

Fig. 5.

INVENTOR
FREDERICK F. JOHNSON
BY
Jamison, Hardman & Flora
ATTORNEYS

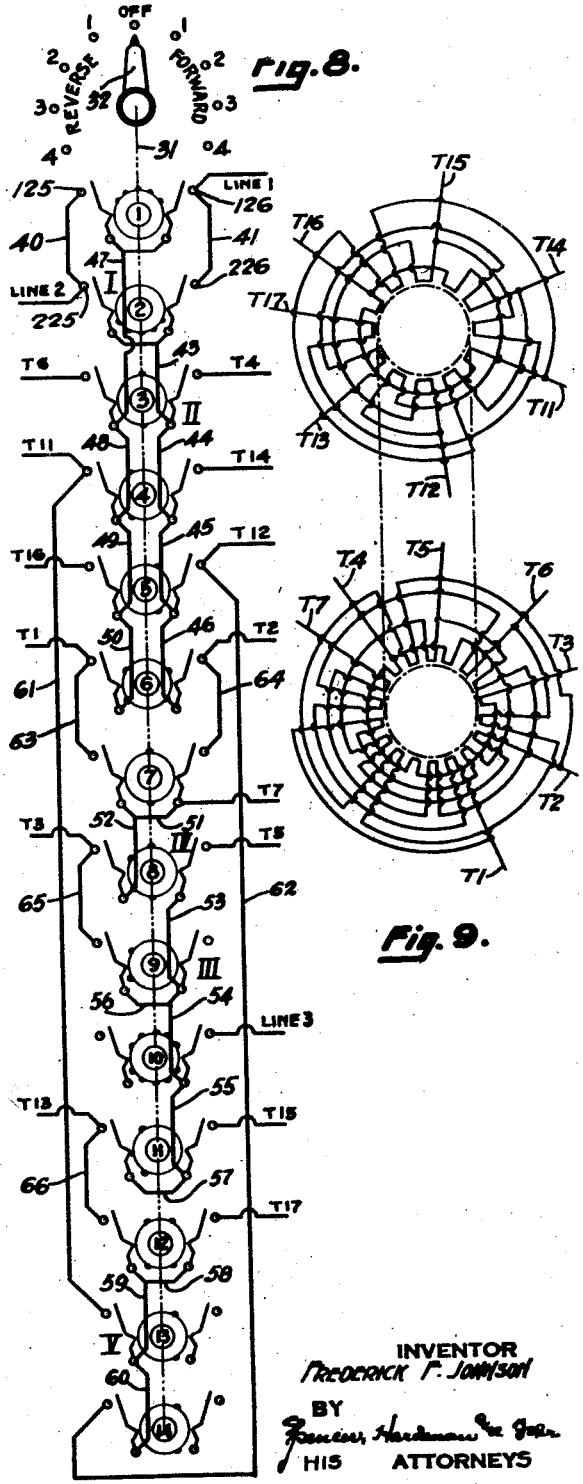

Patented June 24, 1947

2,422,906

UNITED STATES PATENT OFFICE 2,422,906

STAR-DELTA MOTOR CONTROLLER

Frederick F. Johnson, Dayton, Ohio, assignor to General Motors Corporation, Detroit, Mich., a corporation of Delaware Application filed June 22, 1944, Serial No. 541,515

3 Claims. (Cl. 172—280)

1

This invention relates to improvements in the control of reversible, multi-polar electric motors capable of operating at a plurality of different speeds in either direction.

It is among the objects of the present invention to provide a reversible, multi-polar electric motor with a control device having a single actuating lever adapted to be operated into a plurality of positions in a clockwise direction to cause the motor to operate at a corresponding number of different speeds in one direction and operable into a like number of positions counterclockwise to effect motor operation in a reverse direction at a similar number of speeds.

Further objects and advantages of the present invention will be apparent from the following description, reference being had to the accompanying drawings wherein a preferred embodiment of the present invention is clearly shown.

In the drawings:

Fig. 1 is a front view of the assembled controller with the cover removed.

Fig. 2 is a plan view of one of the switch elements, 14 similar elements differing only in the arrangement of the lobes on the cam are shown in stacked relation to make up the assembled unit controller shown in Fig. 1.

Fig. 3 is a front edge view of the switch shown in Fig 2.

Fig. 4 is a symbolic showing of the four-pole Y and the eight pole delta phase winding of the electric motor.

Fig. 5 is a similar symbolic showing of the six-pole Y and twelve-pole delta phase winding of the electric motor.

Fig. 6 is a motor connection chart.

Fig. 7 is a chart showing the contacts and operating cams of all fourteen of the switches and indicating at which of the forward or reverse switch positions each switch is closed to complete a circuit across it.

Fig. 8 is a diagrammatic view of the switch assembly and its permanent inter-switch connection as well as the terminal connection with the motor circuit indicated similarly in Fig. 9.

Fig. 9 is a diagrammatic view of separate stator windings, the dot-and-dash lines indicating that all windings are secured in a single motor frame unit.

Referring to the drawings and more particularly to Figs. 1, 2 and 3 thereof, the numeral 20 designates the entire controller. As has been mentioned in the preamble, this controller comprises fourteen stacked switches, a switch unit being detailedly shown in Figs. 2 and 3. Each

2 switch unit comprises an insulating base 21 having blocks 22, 23 and 24 formed integral therewith. All of these blocks have projecting portions, the one on block 22 being designated by the numeral 22a, the one on block 23 by the numeral 23a and the one on block 24 by the numeral 24a. Corresponding recesses 23b and 24b are provided in the bottom surface of each base 21 so that the projections of the one switch extend into the recesses of the base of the adjacent switch whereby all switches may properly be stacked.

The block 22 supports a stationary contact member 25 while block 23 supports a similar stationary contact member 26.

A bracket 27 is secured to base 21 in the switch in any suitable manner, this bracket 27 having one end of a flexible contact arm 28 secured thereto. A similar flexible contact arm 29 is secured to a bracket 30 anchored to the base 21. These contact arms 28 and 29 have inwardly extending lip portions adapted to be engaged by the lobes of a cam 30. All of the cams have a serrated opening for receiving a serrated operating shaft 31 so that rotation of this operating shaft 31 will actuate all of the cams at all of the switches simultaneously.

In Fig. 1 the numeral 32 designates a single actuating lever which is secured to the end of the operating shaft 31 extending outside of the casing 33 of the controller. Within the portion 34 at the top of the switch there is provided any suitable ratchet mechanism for positioning and releasably holding the operating lever 32 when it is moved into positions 1, 2, 3 or 4 clockwise or counterclockwise. These positions are indicated at the top of Fig. 8. All of the switches are secured to the back 35 of the switch casing 33 in any suitable manner so as to be maintained in stacked relation, as shown in Fig. 1.

For purposes of description the switches of the controller are indicated by the numerals 1 to 14 inclusive, No. 1 being the top switch unit and No. 14 being the bottom switch unit. All of the fourteen switch units in the controller are substantially identical with the exception of the operating cam of each which differs in the following manner, reference being had to the chart shown in Fig. 7. As shown in this chart, the cam of switch No. 1 has four lobes adapted to actuate the right contact of this switch unit in all four forward operating positions. These lobes actuate the left contact of this switch unit in all four reverse positions. The cam of the switch No. 2 has four cam lobes which are also adapted to close the left contact of this switch unit in response to the operation thereof in all four forward positions. These lobes actuate the right contact in all four reverse positions. The cam of the switch No. 3 has cam lobes diametrically opposite so that both sets of contacts of this switch are closed only in the third position, forward or reverse. The two lobes of the cam of switch No. 4 are so arranged that they will close the left contact of this switch in the second position forward or reverse and the right contacts in the fourth position forward or reverse. Switch No. 5 has the two lobes of its cam so arranged that they will close the left contacts of the switch in the fourth position forward or reverse and the right contacts in the second position forward or reverse. The cam of switch No. 6 has four lobes so arranged that the contacts thereof are closed in the first position both forward and reverse. Switch No. 7 has a cam with two lobes so arranged that both contacts of this switch are closed in the third position both forward and reverse. The cam switch No. 8 has four lobes adapted when actuated in either forward or reverse direction to close the left contact at the first and third position and to close the right contact at the third position. Switch No. 9 has a cam with two lobes so arranged that the left contacts of this switch are closed at the first position forward and reverse. The right contact of this switch does not function at any time. Switch No. 10 has a cam with eight lobes adapted to actuate both sets of contacts of this switch in all positions, forward and reverse. This cam provides "double break" contacts for line 3, thereby increasing the capacity of the switch. If double break feature is not required, switch section No. 10 may be omitted, line 3 would then connect to the jumper 54 and 55 between the movable contacts of sections No. 9 and No. 11. However, the left contacts of this switch are not connected in any circuits and are substantially inactive electrically. Switch section No. 11 has a two-lobe cam so arranged that the left contacts will be closed in the second position forward or reverse and the right contacts in the fourth position forward or reverse. The cam of switch No. 12 has four lobes adapted to close the left contacts as well as the right contacts at the second and fourth positions both forward and reverse. Switch No. 13 has a cam with two lobes adapted to close the left contacts at the fourth position forward or reverse. The right contacts of this switch are electrically inactive. Switch No. 14 has a two-lobe cam adapted like switch No. 13 to close its left contacts at fourth position forward or reverse, the right contacts being electrically inactive.

Reference above to the left contacts including contacts corresponding to those numbered 25 and 28 in Fig. 2 and right contacts are those corresponding to contacts 26 and 29 of Fig. 2.

The Fig. 8 is a diagrammatic view of the switch assembly and its inner and outer electrical connections. By inner connections is meant the connections in the switch between certain contacts thereof, as for instance, stationary contact 125 of switch No. 1 is connected with stationary contact 225 by a strap 40. Similarly contact 126 of switch No. 1 is connected with contact 226 of switch No. 2 by a strap 41. The two movable contacts of switch No. 2 are connected together while the movable contacts of switch No. 2 are also connected with the movable contacts of switches Nos. 3, 4, 5 and 6 by straps 43, 44, 45 and 46 respectively. The two movable contacts of switch No. 1 are connected together and with the movable contacts of switches 3, 4, 5 and 6 by straps 47, 48, 49 and 50, respectively. The two movable contacts of switch No. 7 are connected with each other through strap 51 and with the left movable contact of switch No. 8 by the strap 52. The right movable contact of switch No. 8 is connected with the right movable contacts of switches Nos. 9, 10 and 11 by straps 53, 54 and 55, respectively. The movable contacts of switch No. 9 are connected together by strap 56 and the two movable contacts of switch No. 11 are connected together by strap 57. The two movable contacts of switch No. 12 are connected together by strap 58 and also connected with the left movable contact of switches Nos. 13 and 14, by straps 59 and 60. The left movable contact, referred to above, coincides with the contact 28 of the unit shown in Fig. 2, while the right movable contact referred to corresponds to the flexible blade contact 29 of the switch shown in Fig. 2. For purposes of condensation the group of straps 47, 48, 49 and 50 may be referred to by the Roman numeral I. The group including straps 43, 44, 45 and 46 by the Roman numeral II. Straps 53, 54, 55, 56 and 57 by the Roman numeral III. Straps 51 and 52 by the Roman numeral IV and straps 58, 59 and 60 by the Roman numeral V.

The stationary contact 126 of switch No. 1 is connected to the power line. Similarly stationary contact 225 of switch No. 2 is connected to the power line 2. The left stationary contact of switch No. 3 is marked T6, indicating that it is connected to the lead T6 of stator winding similarly marked as indicated in Fig. 9. The right stationary contact of switch No. 3 is connected to T4 of the lead to the stator winding of the motor. The left and right stationary contacts of switch No. 4 are connected respectively to the stator leads T11 and T14, as indicated in Fig. 9. The left stationary contact of this switch No. 4 is also connected with the left stationary contact of switch No. 13 by a strap 61. Stationary contacts of the switch No. 5 are connected, the left one to lead T16, the right one to lead T12 of the stator windings, as indicated in Fig. 9. The right stationary contact of switch No. 5 is connected with the left stationary contact of switch No. 14 through the strap 62. The left and right stationary contacts of switch No. 6 are connected to the motor leads T1 and T2 respectively. The left stationary contact of switch No. 6 is also connected with the left stationary contact of switch No. 7 by a strap 63, while the right stationary contact of switch No. 6 is connected with the right stationary contact of switch No. 7 by a strap 64. The left and right stationary contacts of switch No. 8 are connected with motor leads T3 and T5, as indicated in Fig. 9, the left stationary contact of this switch No. 8 being connected with the left stationary contact of switch No. 9 by the strap 65. The right stationary contact of switch No. 10, however, is connected with the power line 3. The left and right stationary contacts of switch No. 11 are connected with motor leads T13 and T15, as indicated in Fig. 9. The left stationary contact of this switch No. 11 has a strap 66 connecting it with the left stationary contact of switch No. 12. The right stationary contact of switch No. 12 is connected with the motor lead T17. The corresponding contact of switch No. 13 is inactive. However, the left stationary contact of this switch is, as has been previously mentioned, provided with a strap connection 61 leading to the corresponding left stationary contact of switch No. 4. The right contacts of switch No. 14 are electrically inactive while the left stationary contact has strap 62 connected with a right stationary contact of switch No. 5.

Fig. 4 is a symbol showing the motor stator as having one portion providing a 4 pole parallel Y and an eight pole series delta.

Fig. 5 shows the motor stator as having also a six pole parallel Y and a twelve pole series delta winding arrangement.

Fig. 6 clearly indicates the various connections in order to obtain various speeds. As has been previously mentioned, the actuating lever 32 is adapted to rotate and operate shaft 31 shown in cross section in Fig. 2 and indicated by the dot-and-dash line in Fig. 8, as connecting all the cams of all 14 switches constituting the actuator assembly, this shaft moving the cams in either one direction for reverse motor movement or in the opposite direction for forward motor operation. This actuating lever 32 when moved into first position forward actuates all of the switch cams and, as indicated in the chart, Fig. 6, under these circumstances the power line L1 is connected to the terminal T1; the power line L2 is connected to the terminal T2, while the power line L3 is connected to the terminals T3 and T7. Terminals T4, T5, T6, T11, T12, T13, T14, T15, T16 and T17 are unconnected under these circumstances. Now circuit connections are made with a motor causing it to operate at low speed forward.

When lever 32 is actuated to position 2 clockwise L1 which is line 1 is connected with terminal 11, L2 with terminal T12, and L3 with terminals T13 and T17. Now terminals T1 and T7 inclusive, T14, T15 and T16 are unconnected. With these circuits complete the motor operates at second speed forward.

To cause the motor to operate at third speed forward, lever 32 is actuated clockwise to position 3. Now the various cams of the switches are moved so that line 1 is connected with T6, line 2 with T4 and line 3 with T5. T1, T2, T3 and T7 are connected together by the strap connections 51, 52, 63 and 64 and switch sections 7 and 8; and T11 to T17 inclusive are unconnected.

Moving the actuator lever 32 clockwise to position 4 results in the cams of the switches actuating the various switches to complete the following circuit: Line 1 to T16, line 2 to T14, line 3 to T15; T11, T12, T13 and T17 being connected together, and T1 to T7 inclusive being unconnected. Now the motor operates at its highest speed.

For reverse operation the actuating lever 32 is moved counterclockwise to positions 1, 2, 3 and 4. In all these positions the motor connections are indicated in the diagram, Fig. 6, with the exception that the L2 will occupy the first column to the left now occupied by L1 and L1 will occupy the top of the second column shown to be occupied by L2. Briefly, all motor connections are as indicated in the diagram of Fig. 6 changing the positions of L1 and L2 reversely.

The switch unit itself as shown in Fig. 2 is of a well known construction. However, applicant has provided an improved motor controller by assembling 14 of these switches, the strap relation connecting certain elements of certain switches together while maintaining others electrically idle and so arranging the lobes of the cams and the cams themselves on the common cam-actuating member so that the proper connections are made with motors of standard design whereby the motor may be operated at a plurality of speeds in either direction depending upon the operation of the switch actuator either clockwise or counterclockwise in the various speed positions.

Applicant has provided a unitary switch controller adapted to be moved clockwise or counterclockwise to obtain operation of the motor at various speeds in either direction. Usually a controller of this type is adapted to be operated in one direction to obtain a plurality of motor speeds with the motor operating in one direction while the switch unit may be operated only in one position reversely to obtain only a single speed reverse operation of the motor. Where a larger number of reverse operations of the motor is desirable it would be necessary to supply additional switch units to obtain such motor operation. As has been said applicant eliminates the necessity of additional switches by so constructing the switch operating cams and arranging the lobes on said cams and the connections between the elements in the switches forming the unit whereby the unit may be operated into a plurality of positions clockwise to obtain a plurality of speeds of the motor operation in one direction and be operated in a plurality of positions counterclockwise to obtain motor operation at different speeds in a reverse direction.

While the embodiment of the present invention as herein disclosed, constitutes a preferred form, it is to be understood that other forms might be adopted, all coming within the scope of the claims which follow:

What is claimed is as follows:

1. A controller for a 3-phase A. C. motor having a stator winding for N pole series-delta operation or for $$\frac{N}{2}\text{-pole}$$

parallel Y operations and having end terminals T7 and T3 and intermediate terminals T5, T2, T6, T1, T4 and having a stator winding for N'-pole series-delta operation or for $$\frac{N'}{2}\text{-pole}$$

parallel Y operation and having end terminals T17 and T13 and intermediate terminals T15, T12, T16, T11, T14, N' being a number less than N and greater than $$\frac{N}{2}$$

said controller having line terminals 1, 2 and 3 and conductors referred to hereinafter by I, II, III, IV, V (IV being connected to T7) and a single controlling member having four positions forward (F) from off position and four position reverse (R) from off position and having fourteen switches variously operated by the controller member for making the following connections: switch 1, line 1 to conductor I in F positions 1, 2, 3 and 4, line 2 to conductor I in R positions 1, 2, 3 and 4; switch 2, line 2 to conductor II in F positions 1, 2, 3 and 4, line 1 to conductor II in R positions 1, 2, 3 and 4; switch 3, conductor I to T6 and conductor II to T4 in positions 3, F and R; switch 4, conductor I to T11 in positions 2, F and R, and conductor II to T14 in positions 4, F and R; switch 5, conductor I to T16 in positions 4, F and R, and conductor II to T12 in positions 2, F and R; switch 6, conductor I to T1 and conductor II to T2 in positions 1, F and R; switch 7 conductor IV to T1 and T2 in positions 3, F and R; switch 8, conductor IV to T3 in positions 1, F and R; conductor IV to T3 and conductor III to T5 in positions 3, F and R; switch 9, conductor III to T3 in positions 1, F and R; switch 10, line 3 to conductor III in positions 1, 2, 3 and 4, F and R; switch 11, conductor III to T13 in positions 2, F and R, and conductor III to T15 in positions 4, F and R; switch 12, conductor V to T13 and T17 in positions 2 and 4, F and R; switch 13, conductor V to T11 in positions 4, F and R; and switch 14, conductor V to T12 positions 4, F and R.

2. A controller for a four speed, reversible three phase alternating current motor having two stator windings, the one, provided with seven terminal wires, viz: T3, T4, T1, T6, T2, T5 and T7 with equal groups of field windings connected between each two adjacent terminal wires excepting between the two extreme terminals T3 and T7, certain of said terminals, when connected to a source of three-phase electric current causing the motor to operate as a multi-pole series delta motor at low speed, while other terminal wires of this stator winding, when connected to said source of current and some together, causing the motor to operate as a parallel Y motor at a different or third speed, the second stator winding also having seven terminal wires, viz: T17, T15, T12, T16, T11, T14 and T13, with equal groups of pole windings connected between each two adjacent terminal wires excepting the two extremes T17 and T13, certain of said terminals, when connected to the source of electric power causing the motor to operate at second speed as a multi-pole series delta-motor, other terminals, some connected together and others to the source of current, causing the motor to operate at fourth or high speed as a series Y motor, said controller comprising a single operating member rotatable from "off" position into four different positions forward and reverse and having power line terminals 1, 2 and 3 and interconnected switching means operated in the first position forward to connect line 1 with terminal T1, line 2 to terminal T2 and line 3 to terminals T3 and T7, all other terminals being kept open thereby causing the motor to rotate forward as a X-pole series delta motor, whereby when the actuator is moved clockwise into its first position, power line 1 will be connected to motor terminal 1, power line 2 to motor terminal T2 and power line 3 to both motor terminals T3 and T7, all other motor terminals being kept open by the controller thereby causing the motor to rotate forward, at low speed as a X pole series delta motor; when the actuator is moved clockwise into its second position, the power line 1 is connected to motor terminal T11, power line 2 to motor terminal T12 and power line 3 to both motor terminals T13 and T17, the controller maintaining all other terminal circuits open and thereby causing the motor to rotate forward at second speed as a Y pole series delta motor; when the actuator is moved clockwise into its third position, the power line 1 is connected to motor terminal T6, the power line 2 to motor terminal T4 and line 3 to motor terminal T5. Motor terminal T1 is connected to T2 and T3 to T7, the controller maintaining all other motor terminal connections open thereby causing the motor to rotate forward at third speed as a $$\frac{X}{2}\text{-pole}$$

parallel Y motor, operation of the actuator clockwise into its fourth position causing the controller to connect power line 1 with motor terminal T16, power line 2 with motor terminal T14 and line 3 with motor terminal T15, motor terminals T11 and T12 are connected together as are motor terminals T13 and T7, all remaining motor terminals are disconnected thereby causing the motor to rotate forward at high or fourth speed as a $$\frac{Y}{2}\text{-pole}$$

parallel Y motor; X and Y being different even numbers, return of the actuator to normal "off" position will actuate the controller to open all circuits and stop the motor; and operation of the actuator counter-clockwise will operate the controller to reverse only two power line connections as follows: first position, power line 1 to motor terminal T2 and line 2 to motor terminal T1; second position line 1 to motor terminal T12 and line 2 to T11; third position power line 1 to motor terminal T4 and line 2 to motor terminal T6; fourth position, line 1 to motor terminal T4 and line 2 to T16, all other line and motor terminal connections being identical in both directions of motor operation.

3. A controller for a four speed, reversible three phase alternating current motor having two stator windings, the one, provided with seven terminal wires, viz: T3, T4, T1, T6, T2, T5 and T7 with equal groups of field windings connected between each two adjacent terminal wires excepting between the two extreme terminals T3 and T7, certain of said terminals, when connected to a source of three phase electric current causing the motor to operate as a multi-pole series delta motor at low speed, while other terminal wires of this stator winding, when connected to said source of current and some together, causing the motor to operate as a parallel Y motor at a different or third speed, the second stator winding also having seven terminal wires, viz: T17, T15, T12, T16, T11, T14 and T13, with equal groups of pole windings connected between each two adjacent terminal wires excepting the two extremes T17 and T13, certain of said terminals, when connected to the source of electric power causing the motor to operate at second speed as multi-pole series delta-motor, other terminals, some connected together and others to the source of current, causing the motor to operate at fourth or high speed as a series Y motor, said controller, operative for completing connections to cause the motor to operate at four different speeds in either direction, being a unitary assembly comprising fourteen switch elements secured together in stacked relation, substantially each switch element having active right and left movable contact arms; cooperating right and left stationary contacts engageable by the respective contact arms, and an actuating cam operative clockwise and counter-clockwise to actuate the contact arms into engagement with their respective stationary contacts at predetermined points in the rotation of the cam, the unitary mechanism having a common actuator to which all of the cams of the fourteen switches are secured for concurrent rotation, in either direction, into any one of the four positions either side of "off" position, said unitary control device having a plurality of separate conductors respectively for making the following connections: the two movable contact arms of switch No. 1 to the left, movable contact arms of the switches Nos. 3, 4, 5 and 6; the two right stationary contacts of switches Nos. 1 and 2 and power line 1; the two left stationary contacts of switches Nos. 1 and 2 also power line 2; the two movable contact arms of switch No. 2 and the right movable contact arms of switches Nos. 3, 4, 5 and 6; the right stationary contacts of switches Nos. 6 and 7 and terminal T2; the left stationary contacts of switches Nos. 6 and 7 and terminal T1; the two movable contact arms of switch No. 7 and the left movable contact arm of switch No. 8 and terminal T7; the left stationary contacts of switches Nos. 8 and 9 and terminal T3; the right movable contact arms of switches Nos. 8, 9, 10 and 11 and the left movable arms of switches No. 9 and No. 11; the left stationary contacts of switches Nos. 11 and 12 together and terminal T13; the movable contact arms of switch No. 12 and the left movable contact arms of switches Nos. 13 and 14; the left stationary contact of switch No. 4 to which the motor terminal T11 is connected, to the left stationary contact of switch No. 13; the left stationary contact of switch No. 14 to the right stationary contact of switch No. 5 to which the motor terminal T12 is also connected; the left stationary contacts of switches Nos. 3 and 5 being connected respectively to the motor terminals T6 and T16; the right stationary contacts of the switches Nos. 3, 4, 8, 11 and 12 being connected respectively to the motor terminals T4, T14, T5, T15 and T17; the right stationary contact of switch No. 10 being connected to power line 3; the cams of the several switches being constructed for rendering the right and left contacts effective to complete circuits in the clockwise or "forward" and the counterclockwise or "reverse" positions of the actuator as follows: switch No. 1, right contacts, "forward," all four positions, left contacts, "reverse" all four positions; switch No. 2, right contacts, "reverse" all four positions, left contacts "forward" all four positions; switch No. 3, right and left simultaneously closed at third position both "forward" and "reverse"; switch No. 4, right contacts fourth position "forward" and "reverse," left contacts second position "forward" and "reverse"; switch No. 5, right contacts second position both directions, left contacts fourth position both directions; switch No. 6, both sides closed in first position, either direction; switch No. 7, both sides closed in third position, either direction; switch No. 8, right side, third position either direction, left side first and third positions either direction; switch No. 9, left side only, in first position, either direction of rotation; switch No. 10, both sides, all positions, either direction, switch No. 11, right contacts, fourth position either direction, left contacts, second position either direction, switch No. 12, right and left contacts, second and fourth positions, either direction; switch No. 13 left contacts only, fourth position either direction; switch No. 14 left contacts only, fourth position either direction.

FREDERICK F. JOHNSON.

REFERENCES CITED

The following references are of record in the file of this patent:

UNITED STATES PATENTS

| Number | Name | Date |
| --- | --- | --- |
| 1,264,444 | Schmidt | Apr. 30, 1918 |
| 1,335,111 | Hellmund | Mar. 30, 1920 |
| 1,305,268 | Evans | June 3, 1919 |
| 2,319,503 | Glogan | May 18, 1943 |
| 1,789,085 | Seeger | Jan. 13, 1931 |